US 8,990,988 B2

(12) United States Patent
Robbins et al.

(10) Patent No.: US 8,990,988 B2
(45) Date of Patent: Mar. 31, 2015

(54) CORN PREPARATION DEVICE

(75) Inventors: Rodney W. Robbins, Florence, AL (US); Jeffrey Lloyd Norling, Waconia, MN (US); Sean F. Leonard, Pennington, NJ (US)

(73) Assignee: Fox Run USA, LLC, Ivyland, PA (US)

( * ) Notice: Subject to any disclaimer, the term of this patent is extended or adjusted under 35 U.S.C. 154(b) by 164 days.

(21) Appl. No.: 13/474,019

(22) Filed: May 17, 2012

(65) Prior Publication Data

US 2013/0305538 A1    Nov. 21, 2013

(51) Int. Cl.
| | |
|---|---|
| *A23N 15/00* | (2006.01) |
| *A47J 17/02* | (2006.01) |
| *A46B 5/02* | (2006.01) |
| *A46B 15/00* | (2006.01) |
| *A46B 17/04* | (2006.01) |
| *B26D 3/28* | (2006.01) |

(52) U.S. Cl.
CPC ............ *A47J 17/02* (2013.01); *A46B 5/021* (2013.01); *A46B 15/0055* (2013.01); *A46B 17/04* (2013.01); *B26D 3/283* (2013.01)
USPC .............................................. 7/113; 30/121.5

(58) Field of Classification Search
USPC ........ 7/110, 113, 158; 30/121.5, 123; 15/106, 15/DIG. 5, 146
See application file for complete search history.

(56) References Cited

U.S. PATENT DOCUMENTS

| | | | | |
|---|---|---|---|---|
| 408,498 | A | * | 8/1889 | Mason .............................. 7/167 |
| 1,041,049 | A | | 1/1912 | Elliot |
| 2,173,751 | A | | 9/1939 | Burkhart |
| 2,695,416 | A | * | 11/1954 | Raimo ............................ 15/106 |
| D316,634 | S | * | 5/1991 | Vetter ............................ D4/116 |
| 5,659,916 | A | * | 8/1997 | Beatty et al. ................. 15/210.1 |
| 5,664,278 | A | * | 9/1997 | Reisman ................... 15/DIG. 5 |
| D504,540 | S | * | 4/2005 | Bailey .............................. D28/7 |
| D624,792 | S | | 10/2010 | Ghassemian |
| D702,046 | S | * | 4/2014 | Zmrhal et al. ................ D4/120 |
| 2004/0128785 | A1 | | 7/2004 | Lewis et al. |
| 2006/0288582 | A1 | | 12/2006 | Settele |
| 2010/0236074 | A1 | * | 9/2010 | Curtin ......................... 30/121.5 |

* cited by examiner

*Primary Examiner* — Hadi Shakeri

(74) *Attorney, Agent, or Firm* — Jason F. Cotter; Gregory J. Winsky; Archer & Greiner, P.C.

(57) ABSTRACT

A device is provided for cutting and/or de-silking corn on the cob. A single unit has a base and a removable cover. A brush for use in removing silks is mounted on one side of the base, and a cutter is mounted on the other side. When it is desired to use the tool on one side instead of the other, the cover is placed over the other tool. The cover then is used as an easy-to-grip palm-fitting structure to push the brush or the cutter along the ear of corn.

13 Claims, 2 Drawing Sheets

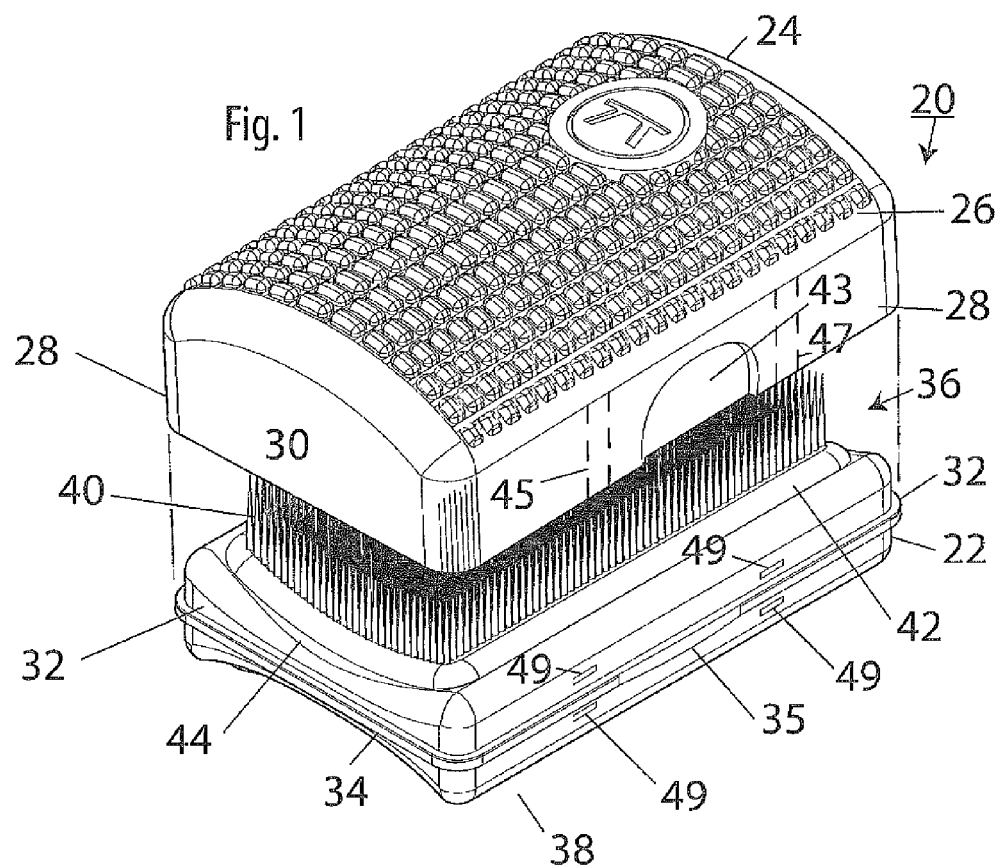
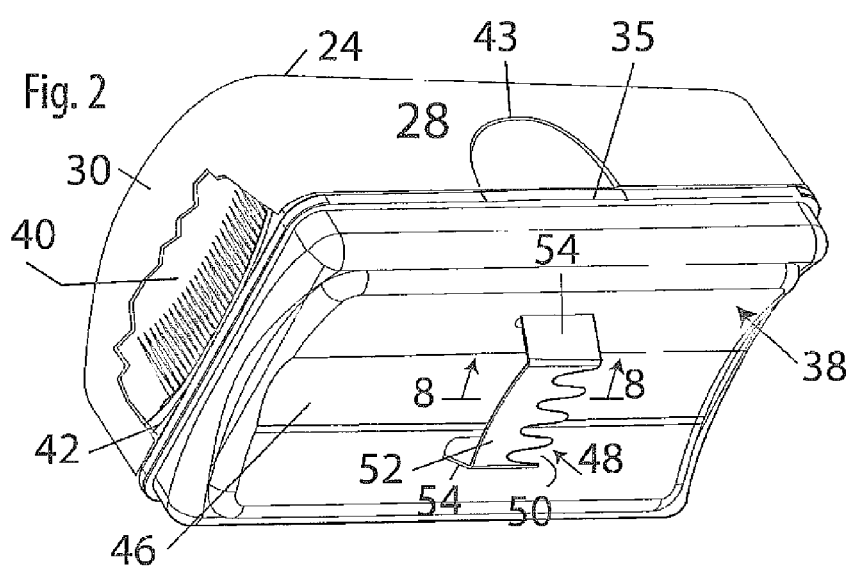

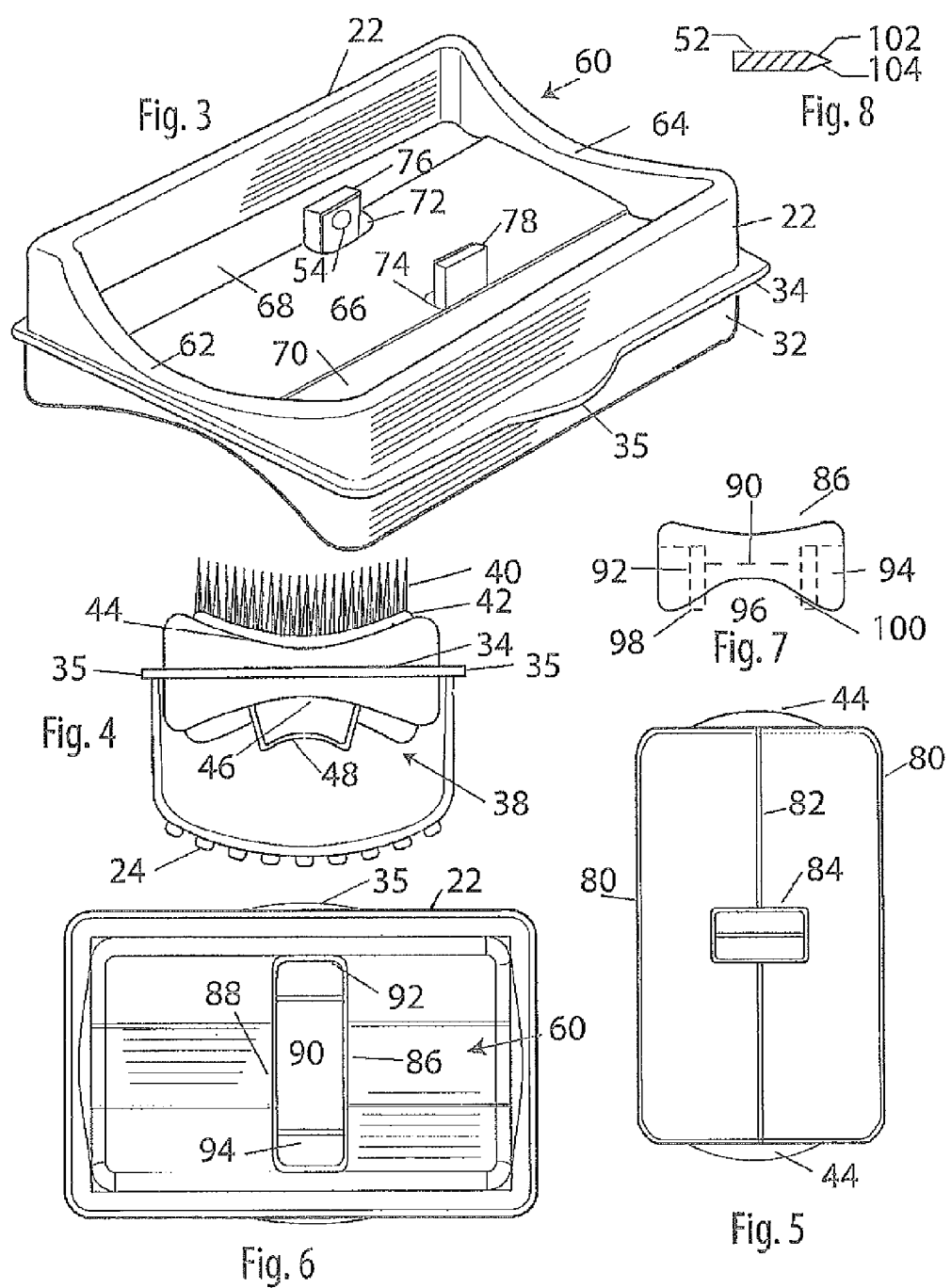

CORN PREPARATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION (1) Field of the Invention

This invention relates to devices for preparing corn-on-the-cob to be eaten. More specifically, the invention relates to devices for use in cleaning the silks of the corn away from the corn-on-the-cob, and to cutter devices for removing the corn kernels from the cob.

(2) Description of Related Art Including Information Disclosed Under 37 CFR 1.97 and 19.8

Devices have been proposed and sold in the past for removing silks from the cob. Cutters also have been proposed for removing corn kernels from the cob.

Some of the prior corn cutters suffer from the problem that an elongated handle gets in the way of the cutting operation and tends to make it difficult to use.

It also has been proposed in the past to mount both a brush and a cutter on a single elongated handle, with the blade of the cutter being positioned so that the handle is perpendicular to the corn cob as the device is used to cut the corn off of the cob. This device, it is believed, also is relatively awkward to use, and has other shortcomings limiting its commercial acceptability.

As a result, known prior devices for cutting corn from the cob, and for removing silks from the corn to be cooked, have generally been awkward to use, and otherwise less than fully satisfactory.

Another problem with prior cutters is that the blades often do not cut the corn to a consistent depth; that is, sometimes, the blades dig into the cob too deeply or not deep enough.

Therefore, it is the object of the present invention to provide a corn preparation device which eliminates or alleviates the foregoing problems.

More specifically, it is an object to provide a device which can be held easily in the hand while cutting corn from the cob, or while removing silks from the corn cob, and with only minimal contact between the hands of the user and the corn.

It also is an object of the present invention to provide a protective holder for the corn cutter to keep it from cutting inadvertently.

It is a further object to provide such a device which is easily convertible from de-silking brush to a cutter so that both functions can be provided in a single compact device.

BRIEF SUMMARY OF THE INVENTION

In accordance with the present invention, the foregoing objectives are met by the provision of a single structure which is easy to grasp and can be used either as a corn cutter in cutting corn from the cob, or as a brush for removing silks from the cob.

The foregoing is accomplished by the novel construction in which a base member is provided with first and second opposing faces of a relatively broad extent. Extending from a first one of the surfaces is a brush, and extending from the opposite one of the surfaces is a cutter. A cover is provided to cover either one of the two implements. The cover fits securely onto the body so as to form a palm-fitting pushing structure against which the user can push. The device can be converted from a cutter to a de-silking brush, or vice versa, simply by moving the cover from one surface to the other.

The invention further provides a cutter blade which is sharpened on both sides of the edge. This tends to guide the blade in a straight path, not forcing it to dig too deeply or cut too shallowly in passing through the corn.

Because the cover forms a palm-fitting structure for the device, it is believed to be easier to use and to push than certain other devices which have an elongated handle, and tends to hold the fingers of the user out of contact with the corn, thus minimizing such contact and minimizing covering the fingers with messy food juices, butter, and minimizing potential contamination.

The foregoing and other objects and advantages of the invention will be set forth in or apparent from the following description and drawings.

BRIEF DESCRIPTION OF THE SEVERAL VIEWS OF THE DRAWING(S)

FIG. 1 is an exploded perspective view of the scrubber-cutter device of the present invention;

FIG. 2 is a bottom perspective view of the two units shown in FIG. 1 assembled together with parts of the structure cut away to better illustrate the device;

FIG. 3 is a bottom perspective view of the base member of the present invention with the brush assembly removed and the bottom portion facing upwardly;

FIG. 4 is an end elevation view, partially cut away, of the device shown in FIG. 2 with the cover reversed to the bottom side to cover the cutter and leave the brush exposed;

FIG. 5 is a bottom plan view of a brush unit which fits into the base member shown in FIG. 3, with the bristles on the other side of the structure shown in FIG. 5 and therefore not visible;

FIG. 6 is a bottom plan view of the interior of the structure shown in FIG. 3, with a bridge element positioned in the structure to help support the brush member;

FIG. 7 is a side elevation view of the bridge member piece shown in FIG. 6; and

FIG. 8 is a broken-away cross-sectional view through the cutting blade taken along line 8-8 of FIG. 2.

DETAILED DESCRIPTION OF THE INVENTION

Referring first to FIG. 1 of the drawings, a fresh corn cutter and de-silken 20 is shown in an exploded view.

The device 20 includes a base member 22 with a brush 40 extending upwardly from the base on a first side 36 of the base, and (referring to FIG. 2) a corn cutter 48 with a blade 52 extending from the lower surface 38 of the base member. A cover 24 is provided. Cover 24 has side walls 28 and 30, and a curved upper surface 26 which has a decorative finish simulating the look of an ear of corn. The cover 24 is shown lifted above the base 22, as is customary in an exploded view.

When it is desired to use the cutter 48 on the bottom surface 38 to cut corn off of the cob, the cover is placed over the brush by pressing the cover down over the edge 32 and against a ledge 34 extending circumferentially around the side of the base 22. By this means, the cover is fastened securely to the base. The assembled unit is comparable in size and shape to a bar of soap, and can be fitted into the palm of the hand of the user to push the blade 52 longitudinally through the corn-on-the-cob to strip the fresh corn kernels from the cob.

FIG. 4 of the drawings shows the cover 24 reversed and attached to the bottom edge of the base member 22 so that it covers the cutter 48. This leaves the brush 40 exposed so that it can be used to de-silk the corn.

Whether the device is used for de-silking the corn or cutting it, the cover forms a convenient, fairly tall grippable structure which fits neatly into the palm of an adult hand, much like a bar of soap. The cover provides an upwardly spaced gripping surface which raises the fingers of the hand above the surface of the corn so that the fingers are not so easily soiled and so that the corn tends to be more protected from possible contamination by contact with the fingers. When the device is stored, the cover can cover either the brush or the cutter. If it covers the cutting blade, this protects against accidental cutting of objects or fingers.

1. Base Member

The base member 22 is shown in FIGS. 1, 2 and 3. Referring particularly to FIG. 3, the base member is a molded plastic part with a projecting ridge 34 around the periphery with slight extensions of the ridge at 35. The projections 35 are used as grippers to hold the body member with one's fingers when the cover 24 is being removed or replaced on the body. The vertical walls are curved as at 62 and 64 in a shape approximating the curvature of a typical ear of corn. The base member is shaped to accommodate the ear of corn, both on the bottom surface 38 and the upper surface 36.

2. Brush Structure

The brush structure 40 is illustrated in FIGS. 1, 4 and 5. The brush structure is a single molded part comprising a molded bristle base 42 and molded brush bristles formed in the same molding operation. Low density polyethylene is the material of which the base and bristles are made so as to make them relatively soft and flexible.

The underside of the brush unit is shown in FIG. 5. Flexible vertical plastic walls 80 form an elongated rectangular shape to match that of the base member 22 and to fit into the cavity 60 shown in FIG. 3 with an interference fit. Tabs extend from the opposite short ends 44 of the bristle base to facilitate removing and replacing the bristle base in the base member 22, thus providing means for separating the parts for washing.

As it can be seen in FIG. 4, the upper surface of the bristles and the upper edge of the bristle base 42 are given with a curvature approximating that of an ear of corn.

Referring again to FIG. 5, in the longitudinal center of the bristle base structure shown in FIG. 5 is a reinforcing rib 82. A projection 84 is formed which, when the bristle base 42 is fitted into the base member 22, extends downwardly by a predetermined distance to abut against a surface 90 (see FIG. 6) of a bridge member 86 which is fitted into the cavity 60 of the base member 22 shown in FIG. 3. This provides vertical support for the flexible bristle base and bristles to prevent undue distortion under the scrubbing force or cutting force applied by the user.

3. Cover

The cover 24, which is shown in FIGS. 1, 2 and 4, has a thumb-shaped recess 43 (FIG. 1), two pairs of slight projections 49 located above and below the projection or flange 34, and two slight vertical projections on the internal surface of the side wall 28 of the cover to mate with the projections 49 to provide a secure but releasable friction fit between the cover and the base member. The thumb recess 43 increases the degree of effective projection outwardly of the areas 35 which facilitates gripping of the cover and the base to push them together or pull them apart.

The cutter 48 and its blade 52 are best seen in FIGS. 2, 4 and 8. The cutter 48 comprises a blade which is generally U-shaped with a curvature in the direction shown in FIG. 3 so as to approximate the curvature of an ear of corn.

Referring again to FIG. 3, the base member 22 has a pair of through holes 72 and 74, and a pair of upstanding projections, 76 and 78 near the holes.

Referring to FIG. 2, the cutter 48 includes the blade 52 with two legs 54 extending through the body 22. FIG. 3 shows those legs 54 are attached to the projections 76 and 78 to anchor the legs of the cutter solidly. The legs are attached by adhesive and ultrasonic bonding.

The bridge member 86 is shown in FIG. 7 and it forms two vertical receptacles 92 and 94 into which the projections 76 and 78 fit, with a pair of tabs 98 and 100 to fit into the holes 72 and 74. The bridge has a curved undersurface as shown at 96 to match the curvature of the lower surface of the structure shown in FIG. 3. That curvature includes a raised portion 66 flanked by recessed portions 68 and 70.

4. Cutter

Referring to FIG. 2, the cutter 48 includes a blade 52 with serrated cutting teeth 50. The cutter blade preferably is made of hard stainless steel of the type and quality used in food processor blades so that it maintains its sharpness for a long time.

The undersurface 38 of the cutter/de-silker device has a longitudinal recess 46 which helps to allow the corn kernels to pass underneath the blade without being cut up any more than necessary.

FIG. 8 is a broken-away, cross-sectional view of the blade 52. The forward cutting edge is ground to be beveled on both sides of the cutting edge, as shown at 102 and 104. This has the advantage that the edge shape does not force the blade downwardly towards the corn cob to cut more of the corn kernels than is desired, nor upwardly to cut too little. This is in contrast to those prior cutters whose blades have been ground only on one side.

Some of the advantages of the invention have been described above. Others include the fact that the assembled device 20 is relatively broad compared with prior devices. This allows a somewhat greater width for the cutting blade of the cutter, therefore allowing more to be cut with each stroke than in some prior devices, and yet does not require the use of excessive force. Similarly, the greater width increases the width of the brush 40 compared with some prior devices, thereby increasing the coverage of the brush and, hence, the speed of the de-Bilking process.

5. Materials

Some of the materials of which the device shown in the drawings is made have been mentioned above. The base 22 and the bridge 86 preferably are made of high impact polystyrene, and the cover 24 preferably is made of SAN.

These materials can be replaced by other suitable materials, within the skill of those experienced in the art.

The above description of the invention is intended to be illustrative and not limiting. Various changes or modifications in the embodiments described may occur to those skilled in the art. These can be made without departing from the spirit or scope of the invention.

The invention claimed is:

1. A corn-on-the-cob preparation device, said device comprising
   a. a broad support body having a thickness and a first broad side and a second broad side opposite said first broad side, each of said broad sides being broader than said thickness,
   b. a brush formed of bristles extending from said first broad side of said body, said brush being adapted to be used to brush away corn silks from corn on the cob,
   c. a corn kernel removing cutter blade extending from said second side and adapted to cut corn kernels from the cob when moved along said cob, and
   d. a cover comprising a closed-top shell placeable over and releasably securable to said body to cover either one of said brush and said cutter to protect the hand of the user from contact with the one of said brush and said cutter it is covering and providing a broad surface to engage with the palm of the hand when using the uncovered one of said brush and said cutter, said cover having a continuous side wall with a lower edge,
   e. said support body having a stop structure extending around its outside periphery between said first side and second side, and providing a structure against which said lower edge of said cover rests when it is covering either one of the said two sides of said support body.

2. A device as in claim 1 including a slight projection adjacent said stop structure on each of two sides of said support body to provide increased frictional engagement between said cover and said support body when said cover is in position on one of said sides.

3. A device as in claim 1 in which said support body is elongated and said brush forms an elongated surface which is curved in a direction perpendicular to the longitudinal axis thereof, and whose curvature approximates the curvature of an ear of corn.

4. A device as in claim 1 in which said stop structure protrudes outwardly from said support body beyond said lower edge of said cover in at least two locations to form a gripping member to grip when removing or applying said cover to said support body.

5. A device as in claim 1 in which said second side of said support body has a longitudinal recess underneath said cutting blade to provide a cut corn conveyance structure, and in which said blade has a cutting edge which is beveled on both sides.

6. A corn-on-the-cob preparation device, said device comprising
   a. a support body having a first broad side and a second broad side opposite said first broad side,
   b. a brush formed of bristles extending from said first side of said body, said brush being adapted to be used to brush away corn silks from corn on the cob,
   c. a corn kernel removing cutter blade extending from said second side and adapted to cut corn kernels from the cob when moved along said cob, and
   d. a cover placeable over and releasably securable to said body to cover either one of said brush and said cutter to protect the hand of the user from contact with the one of said brush and said cutter it is covering and providing a surface to grip in the palm when using the uncovered one of said brush and said cutter in which said support body is elongated and has a longitudinal axis, and said blade extends outwardly from said second side of said support body, and has a curved, serrated cutting blade extending in a direction transverse to said longitudinal axis, said blade being spaced by a predetermined space from said second side, and in which said brush comprises a molded plastic bristle base with molded plastic brush bristles extending therefrom, said bristle base having four relatively flexible vertical sides, said first broad side of said support body having a cavity shaped to receive said vertical sides of said bristle base in an interference-fit whereby said brush is held solidly by said support body but is relatively easily removable and replaceable for cleaning.

7. A device as in claim 6 in which said bristle base has a downwardly extending projection, and said support body has a cavity for receiving the downwardly extending projection from the bristle base to support said bristle base against downward pressure.

8. A multi-use tool device, said device comprising
   a. a support body that is generally flat and broader than it is thick, and having a first broad side and a second broad side opposite said first broad side, and an outer edge,
   b. a first tool comprising a brush extending from said first side of said support body,
   c. a second tool extending from said second side of said support body, and
   d. a cover placeable over and releasably securable to said body and adapted to cover either one of said tools to protect the hand of the user from contact with said one tool, said cover thereby covering said one tool and providing a handle with a surface to grip and apply hand pressure to the other of said tools when said other tool is being used,
   e. said cover comprising a closed-top shell having a continuous side wall with a lower edge shaped to make contact with said support body around said outer edge thereof,
   f. support body having a stop structure extending around said outer edge and providing a flange against which said lower edge of said cover abuts when it is covering either one of the said two sides of said support body, said support body and said cover being dimensioned to form an interference fit with one another.

9. A device as in claim 8 in which each of tools requires the application of hand pressure to force the tool against an object to be acted on by said tool and said cover is generally rectilinear in cross-sectional shape, and has a top wall with a broad surface against which the hand can make contact for pushing.

10. A device as in claim 8 including a slight projection adjacent said stop structure on each of two sides of said support body to provide increased frictional engagement between said cover and said support body when said cover is in position on one of said sides.

11. A device as in claim 10 in which said stop structure protrudes outwardly from said support body and past said lower edge of said cover in at least two locations to form a gripping member to grip when removing or applying said cover to said support body.

12. A device as in claim 8 in which said brush comprises a molded plastic bristle base with molded plastic brush bristles extending therefrom, said bristle body having four relatively flexible vertical sides, said first broad side of said support body having a cavity shaped to receive said vertical sides of said bristle base in an interference-fit, whereby said brush is held solidly by said support body but is relatively easily removable and replaceable for cleaning.

13. A multi-use tool device, said device comprising
   a. a support body having a first broad side and a second broad side opposite said first broad side,
   b. a first tool extending from said first side of said body,
   c. a second tool extending from said second side,
   d. a cover placeable over and releasably securable to said body and adapted to cover either one of said tools to protect the hand of the user from contact with said one tool, said cover thereby covering said one tool and providing a handle with a surface to grip and apply hand pressure to the other of said tools when said other tool is being used,
   e. at least one of said tools being a brush,
   f. in which said brush comprises a molded plastic bristle base with molded plastic brush bristles extending therefrom, said bristle body having four relatively flexible vertical sides, said first broad side of said support body having a cavity shaped to receive said vertical sides of said bristle base in an interference-fit, whereby said brush is held solidly by said support body but is relatively easily removable and replaceable for cleaning, in which said bristle base has a downwardly-extending projection, and said support body has a cavity for receiving the downwardly extending projection from the bristle base to help support said bristle base against downward pressure.

\* \* \* \* \*